United States Patent Office 2,744,090
Patented May 1, 1956

2,744,090

LINEAR POLYESTERS FROM p,p'-SULFONYL DI-BENZOIC ACID PLUS CARBONIC OR OXALIC ACID CONDENSED WITH A GLYCOL

John R. Caldwell, Kingsport, Tenn., assignor to Eastman Kodak Company, Rochester, N. Y., a corporation of New Jersey No Drawing. Application October 3, 1952,
Serial No. 313,062

23 Claims. (Cl. 260—75)

This application relates to valuable linear polyesters prepared by condensing a p,p'-sulfonyl dibenzoic acid diester in conjunction with a carbonic or oxalic acid diester with a polymethylene glycol and/or an aliphatic ether glycol.

It is an object of this invention to provide novel interpolyesters as described herein. It is another object to provide a process as described herein for preparing valuable interpolyesters. Other objects will become apparent hereinafter.

This application is a continuation-in-part of my copending application, Serial No. 143,594, filed February 10, 1950, now U. S. Patent No. 2,614,120, dated October 14, 1952. In that application sulfonyl dibenzoic acid is called bis (dicarboxydiphenylsulfone).

Highly polymeric esters of terephthalic acid and various glycols, for example, ethylene glycol, trimethylene glycol, hexamethylene glycol, etc., are well known, and have been used in the preparation of linear, highly polymeric polyesters having properties including that of being capable of being formed into useful filaments, fibers and the like, and having high melting points and a low degree of solubility in organic solvents. Linear polyesters prepared from other aromatic dicarboxylic acids have also been described in the prior art and contemporary art.

Interpolyesters of terephthalic acid and other dibasic acids condensed with dihydroxy compounds have also been described.

None of the polyesters known in the prior art are easily prepared without high cost. Moreover, they do not possess the herein-described highly advantageous properties which render them especially suitable for processing by injection molding and extrusion methods.

It has now been found that p,p'-sulfonyl dibenzoic acid or its esters or its acid chloride plus carbonic acid or oxalic acid or an ester thereof can be condensed with a polymethylene glycol and/or an aliphatic ether glycol to produce a new kind of linear interpolyester having highly valuable properties which are superior to those of the linear polyesters described in the prior art. Thus, my new interpolyesters can be prepared having a relatively wide softening range and good flow characteristics whereby they are quite valuable for the production of shaped objects by injection molding or extrusion methods. These novel interpolyesters can be prepared so as to soften at temperatures which are above about 180° C. Useful interpolyesters can also be prepared which soften at lower temperatures.

The novel interpolyesters described herein are quite useful in the making of photographic film base. They are also valuable in the manufacture of electrical insulation.

Some of these novel interpolyesters can be employed to form fibers by melt spinning methods.

My novel interpolyesters may contain as constituents thereof small percentages of the m,m' and/or the m,p' isomers of the p,p'-sulfonyl dibenzoic compound without significant deleterious effect on the properties of these interpolyesters. In fact, when the interpolyester is to be employed for purposes other than for making fibers, substantial quantities of these isomers can be employed with some advantageous results, especially as regards increasing the softening temperature range.

These novel interpolyesters are particularly advantageous for preparing a photographic film base and for related purposes because of the excellent dimensional stability and low water absorption quality. Thus, photographic film made from such an interpolyester retains its original dimensions to a very high degree despite the effects of changes in the humidity of the atmosphere, the treatment of the film with developing solutions, etc. The improvement is surprisingly great in comparison to conventional film made with cellulose derivatives such as the various alkanoic esters or the nitrate; moreover, no plasticizer is needed in conjunction with these novel interpolyesters. Furthermore, no solvent need be employed in preparing sheets or film from these novel interpolyesters inasmuch as extrusion methods can be employed whereby substantial savings in the costs of solution methods and solvent recovery can be avoided.

Two of the outstanding qualities of the interpolyesters of this invention are their excellent dimensional stability and low degree of water absorptivity. This results in superior resistance to dimensional change despite changes in atmospheric humidity or immersion in aqueous solutions.

The interpolyesters of this invention have melting points which are up to as much as or more than 50° C. higher than corresponding interpolyesters prepared from dibasic acidic compound combinations described in the prior art. This characteristic results in a much greater effective range of utility for these new interpolyesters, for instance, gaskets can be prepared for employment in equipment operating at higher temperatures, fibers can be made which withstand higher ironing temperatures when fabrics are prepared from yarns incorporating these fibers, etc.

One embodiment of this invention relates to a process for preparing an interpolyester comprising (A) condensing about 10 mole proportions of a sulfonyl dibenzoic compound having the formula:

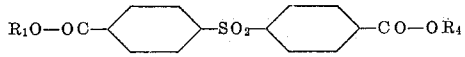

wherein $R_1$ and $R_4$ each represents a substituent selected from the group consisting of a β-hydroxyalkyl radical containing from 2 to 4 carbon atoms, an omega-hydroxyalkyl radical containing from 3 to 12 carbon atoms and an alkyl radical containing from 1 to 6 carbon atoms, plus from about 1 to about 50 mole proportions of an aliphatic acid diester selected from those having the following formulas:

$R_8R_9CO_3$ and $R_8OOC-COOR_9$ wherein $R_8$ and $R_9$ each represents a substituent selected from the group consisting of an omega-hydroxyalkyl radical containing from 2 to 12 carbon atoms and an alkyl radical containing from 1 to 6 carbon atoms, (B) with a dioxy compound selected from the group consisting of those compounds having the following formulas:

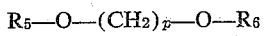

$R_5-O-(CH_2)_p-O-R_6$ and

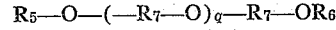

$R_5-O-(-R_7-O)_q-R_7-OR_6$ wherein $p$ represents a positive integer of from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carbalkoxy substituents in the overall combination of the diesters and the dioxy compounds (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

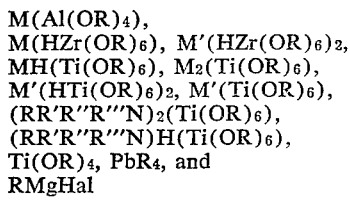

wherein M represents an alkali metal, M' represents an alkaline earth metal selected from the group consisting of magnesium, calcium and strontium, R represents an alkyl group containing from 1 to 6 carbon atoms, R', R" and R'" each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

Advantageously, the dioxy compound is employed in such a proportion that there are from about 1.2 to about 3 oxy substituents in proportion to the carbalkoxy substituents in the overall combination of the diesters and the dioxy compounds. Advantageously, the low pressure defined under (F) is less than about 15 mm. of Hg pressure. Advantageously, the elevated temperature employed during the earlier part of the condensation is from about 150° to about 220° C. Advantageously, the dioxy compound is a glycol having the formula:

wherein p is defined under (B) above.

The dioxy compounds defined above may not actually contain any free hydroxy radicals since they may be in esterified form as indicated by the formulas given. However, these hydroxy or substituted hydroxy radicals are hereinafter referred to generally as hydroxy radicals or substituents. The dioxy compounds which can be employed in accordance with this invention are most advantageously dihydroxy compounds; hence, such compounds are hereinafter referred to as dihydroxy compounds although it is to be understood that dioxy compounds of the type described above are intended to be covered by this term. Each diester is considered as containing two carbalkoxy radicals as that term is employed in the definition of the process as described above since $R_1$ and $R_4$ may be alkyl radicals, omega hydroxyalkyl radicals or β-hydroxyalkyl radicals and $R_8$ and $R_9$ may be alkyl radicals or omega hydroxyalkyl radicals. Even when the process is preceded by the preliminary step described below employing free acids, the term carbalkoxy radicals in the description of the process is intended to encompass such free carboxy radicals.

Furthermore, this invention covers a process as defined above wherein either or both of the sulfonyl dibenzoic acid diester and the carbonic or oxalic acid diester is/are formed by a preliminary step comprising condensing free p,p'-sulfonyl dibenzoic and/or free carbonic or oxalic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F). Advantageously the elevated temperature employed during the preliminary step is substantially that at which reflux conditions subsist; however, higher and lower temperatures can also be employed. Advantageously, as indicated above the dihydroxy compound is employed in such a proportion that there are from about 1.2 to about 3 hydroxy substituents in proportion to the carboxy and carbalkoxy substituents in the overall combination of the diacids, diesters, and dihydroxy compounds.

As indicated above, the interpolyesters described herein have relatively wide softening ranges and good flow properties. In this respect, they differ from most types of high-melting linear polyesters, such as polyethylene terephthalate, which possess sharp melting points. Thus, these modified polyesters of sulfonyl dibenzoic acid soften over a sufficiently wide temperature range that they can be advantageously employed in the production of shaped objects by injection molding and extrusion methods.

The alkylene glycols which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Mixtures of alkylene glycols or ether glycols can also be employed. Examples of ether glycols include diethylene glycol, triethylene glycol, tetraethylene glycol, bis(4-hydroxybutyl)ether, bis(3-hydroxypropyl) ether, etc. When mixtures of alkylene glycols and ether glycols are employed, it is generally preferable to employ a major proportion of the alkylene glycol in order to obtain higher melting linear polyesters. The high melting characteristic also is dependent upon the amount of oxalic or carbonic acid present in the interpolyester and the chain length of the alkylene glycol employed. Higher proportions of oxalic or carbonic acid lower the melting and softening temperatures of the interpolyesters. The same effect is created by employing a longer chain (higher carbon content) alkylene glycol. For example, when a 10–12 carbon atom glycol is employed, the amount of aliphatic ether glycol used should preferably be not more than about 10–20 mole per cent; whereas, when a 2–4 carbon atom glycol is employed the amount of ether glycol can be as high as about 50 mole per cent of the total quantity of dihydroxy compounds employed. When no ether glycol is employed, it is preferred to employ polymethylene glycols containing from 4 to 8 carbon atoms.

Valuable fibers having high melting temperatures can be prepared by incorporating very little, preferably none, of an aliphatic ether glycol and less than 15 mole percent of the oxalic or carbonic acid esters into an interpolyester containing about 85–90 mole per cent of the p,p'-sulfonyl debenzoic constituent. However, on the other hand, valuable interpolyesters can be prepared employing aliphatic ether glycols without any alkylene glycol although the product obtained will not be suitable for forming useful fibers.

The catalytic condensing agents which can be employed have been described above. From about 0.005% to about 0.2% of such catalysts based on the weight of the reactants being condensed can be employed. Higher or lower percentages can also be employed. Generally, from about 0.01% to about 0.06% of the catalytic condensing agent can be advantageously employed based on the weight of the various diester being condensed.

The temperature at which polyesterification can be conducted is dependent upon the specific reactants involved in any given reaction. In general, the reaction mixture can be heated at from about 150° to about 220° C. for from approximately two to three hours in an inert atmosphere (e. g. nitrogen or hydrogen); the mixture can then be heated at from about 225°–240° to about 280°–310° C. in the same atmosphere for approximately 1 to 2 hours. Finally, the pressure can be greatly reduced to form a vacuum (less than about 15 mm. of Hg pressure but preferably on the order less than 5 mm. of Hg pressure) while the temperature is maintained in the same range (225°–310° C.); these conditions are advantageously maintained for approximately 4 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended. Thus, the extent of the substitution of the sulfonyl dibenzoic diesters with the esters of additional modifying acid necessitates variations in these conditions of temperature, pressure and time periods required. The employment of the novel catalytic condensing agents listed hereinabove results in better products being prepared in much less time than is possible when the catalysts of the prior art are employed.

It has been found that the type of catalyst used has an important bearing upon the properties of the final product. Although most of the catalysts cited in the prior art may be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial No. 313,072, Serial No. 313,078, Caldwell and Reynolds Serial No. 313,077, Wellman and Caldwell Serial No. 313,074, Serial No. 313,075 and Serial No. 313,076, and Wellman Serial No. 313,073 for a description of especially advantageous catalytic condensing agents.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is important to exclude oxygen and moisture at all stages of the condensation reaction. Inert atmospheres which can be advantageously employed include nitrogen, hydrogen, helium, etc. Substantially anhydrous reactants can also be advantageously employed although this is not essential, especially if any water is removed in the earlier stages of the condensation.

As indicated above, the acidic constitutents of the interpolyesters are employed in the form of their diesters. The omega-hydroxyalkyl diesters can be prepared as described above by heating a polymethylene glycol, (or an aliphatic ether glycol) with the free acid, preferably employing an excess of the glycol. The beta-hydroxyalkyl diesters can be prepared as described in my parent application employing an alkylene oxide. The acid chlorides can be employed in some cases although the conditions involved are generally substantially different.

Examples of the various diesters which can be employed in accordance with the process of this invention include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc. diesters of either p,p'-sulfonyl dibenzoic acid, carbonic acid or oxalic acid. When the novel catalytic condensing agents described hereinabove and in copending applications referred to herein are employed, the simple alkyl esters of these various dibasic acids can be advantageously employed, whereas if the catalysts known to the prior art are employed, the condensation will not proceed as rapidly or as effectively although satisfactory results can be obtained.

The advantageous ratio of p,p'-sulfonyldibenzoic diester to the modifying oxalic or carbonic acid diester will depend upon the type of product desired. As the mole percent of the modifying acid in the polyester is increased, the melting point of the product is lowered. When short chain glycols such as ethylene glycol and tetramethylene glycol are used, it is usually preferable to employ from 2 to 5 moles of the modifying acid diester for each mole of p,p'-sulfonyl-dibenzoic diester in order to keep the melting point of the product below its decomposition temperature. When higher glycols such as pentamethylene, hexamethylene, and octamethylene glycol are used, from about 2 to about 10 moles of carbonic or oxalic acid can be employed for each ten moles of p,p'-sulfonyl dibenzoic acid.

In general, the polyesters can be conveniently prepared by first condensing an oxalic or carbonic ester with excess glycol to form a low molecular weight polymer which can then be further condensed with an ester of p,p'-sulfonyl dibenzoic acid. Alternatively, all three reactants can be heated together especially when precautions are taken to employ a fractionating column that will prevent the escape of the oxalic or carbonic ester from the reaction mixture.

As indicated hereinabove, some of the isomers of p,p'-sulfonyl dibenzoic acid can be employed under some circumstances with resultant lowering of the melting or softening temperatures but with a probable increase in the softening range of temperatures. The same effect is produced when homologs of p,p'-sulfonyl dibenzoic acid are incorporated into the materials being condensed to prepare these interpolyesters. If homologs are employed they are most advantageously those of p,p'-sulfonyl dibenzoic acid, e. g. m,m'-dimethyl-p,p'-sulfonyl dibenzoic acid, o-ethyl-p,p'-sulfonyl dibenzoic acid, m-methyl-o-propyl-p,p'-sulfonyl dibenzoic acid, etc. Small proportions of various diesters of such isomers and homologs can be employed in substitution for a corresponding quantity of the diester of p,p'-sulfonyl dibenzoic acid when the interpolyester product is not intended to be used in the preparation of fibers.

The products of this invention are linear interpolyesters which possess favorable flow characteristics over a temperature differential or range of about 5° to 20° C. and which contain in the interpolyester configuration a ratio of about 10 of the following repeating units:

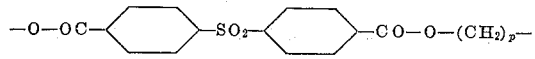

to each 1 to about 50 of one of the following repeating units:

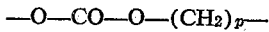

and

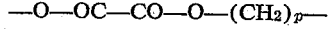

wherein $p$ is defined hereinabove.

The above described interpolyesters can also have any one or more of the three repeating units depicted above replaced entirely or in part, respectively, by one of the following repeating units:

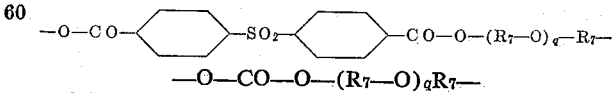

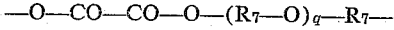

and

—O—CO—CO—O—(R₇—O)$_q$—R₇— wherein $q$ and $R_7$ are defined hereinabove.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

Example 1 (Carbonic ester)

One hundred and eighteen grams (1.0 mole) of ethyl carbonate and 212 g. (2.0 moles) pentamethylene glycol were placed in a distilling flask equipped with a fractionating column. A solution of 0.2 g. sodium titanium ethoxide in ethanol was added as a catalyst and the mixture was heated at 100–120° C. Ethyl alcohol distilled off and the temperature was gradually raised to 160–170°. When 1.7–1.9 moles of alcohol had been removed, the product was cooled to room temperature. It consisted essentially of a low molecular weight pentamethylene carbonate polyester. The reaction product was then placed in a vessel equipped with a stirrer, a short distillation column, and an inlet for purified hydrogen. Seven hundred and ten grams (1.7 moles) of p,p'-sulfonyldibenzoic acid dibutyl ester and 300 g. pentamethylene glycol were placed in the vessel. The mixture was heated at 200–210° C. with stirring. After two hours, the evolution of butyl alcohol ceased, showing that the ester interchange was essentially complete. The temperature was then raised to 260–265° C. and held for thirty minutes. A vacuum of 0.5 to 1.0 mm. was applied, and the stirring was continued at 260–265° C. for 2 hours. A light colored product was obtained that has an inherent viscosity of 0.7 to 0.8 in a 60% phenol-40% tetrachlorethane solution. The polyester begins to soften under pressure at 170–180° C. It does not have a sharp melting point, but gradually softens over the temperature range of 170°–190° C. It can be injection molded to give products that show a high impact strength. It is suitable for extrusion as rods, tubes, sheets, etc. The polyester is soluble in hot tetrachlorethane, and the solutions can be coated onto and stripped from surfaces to give photographic film base materials.

Example 2 (Oxalic ester)

One hundred and forty-six grams (1.0 mole) of ethyl oxalate and 212 g. (2.0 moles) of pentamethylene glycol were heated in a flask equipped with a fractionating column. Sodium aluminum ethoxide (0.3 g.) was used as a catalyst. After approximately 1.8 moles of alcohol had been distilled, the product was transferred to a reaction vessel equipped with a stirrer, a short distillation column, and an inlet for purified nitrogen. The product consisted essentially of a low molecular weight pentamethylene oxalate polyester. Seven hundred and forty-four grams (2.0 moles) of p,p'-sulfonyldibenzoic acid diethyl ester and 300 g. of pentamethylene glycol were then added to the reaction vessel. The mixture was stirred at 200–210° C. in a stream of purified nitrogen. The evolution of ethyl alcohol practically stopped after 2 hours. The temperature was raised to 260° C. and held for 30 minutes. A vacuum of 1.0 to 2.0 mm. was applied and stirring was continued for 2 to 3 hours. The product obtained has an inherent viscosity of 0.5 to 0.6 in 60% phenol-40% tetrachlorethane. This polyester can be molded by injection methods. It can be extruded to make films, tubes, rods, etc. The product can be melt-spun to give filaments that melt at 200–210° C. after they have been drafted.

Example 3 (Carbonic ester)

Three hundred and seventy-two grams (1.0 mole) of p,p'-sulfonyldibenzoic acid diethyl ester, 35 g. (0.3 mole) ethyl carbonate, and 240 g. hexamethylene glycol were placed in a reaction vessel equipped with a stirrer, a distillation column, and an inlet for purified hydrogen. A solution of 0.3 g. sodium titanium exthoxide in ethyl alcohol was added as a catalyst. The mixture was heated at 100–120° C. in a stream of pure hydrogen, with stirring. Ethyl alcohol distilled off from the reaction. The column was adjusted so that no ethyl carbonate was removed. The temperature was gradually raised to 200–210° C. during a period of 4 hours. It was held at 200–210° C. for 30 minutes, then raised to 260° C. and held for 30 minutes. A vacuum of 2 to 3 mm. was then applied, and stirring was continued for 4 hours. A product having an inherent viscosity of 0.60 to 0.70 in 60% phenol-40% tetrachlorethane was obtained. The polyester can be molded, extruded, or pressed to give shaped products. Films, after orienting by drafting, followed by heat treatment, soften at 190–200° C. This product is also useful as an electrical insulator.

Example 4 (Carbonic ester)

The procedure Example 3 was repeated exactly except that octamethylene glycol was used in place of hexamethylene glycol. A product softening at 170–180° C. was obtained.

Example 5 (Carbonic ester)

An interpolyester was made in a manner similar to that described in Example 1 by condensing one mole of p,p'-sulfonyldibenzoic acid butyl ester plus 3 moles of propyl carbonate with six moles of tetramethylene glycol. The product obtained is useful as a molding plastic.

Example 6 (Oxalic ester)

One hundred and forty-six grams (1.0 mole) of ethyl oxalate and 212 g. (2.0 moles) of diethylene glycol were heated in a flask equipped with a fractionating column. Potassium titanium ethoxide (0.3 g.) was used as a catalyst. After approximately 1.8 moles of alcohol had been distilled, the product was transferred to a reaction vessel equipped with a stirrer, a short distillation column and an inlet for purified nitrogen. The product consisted essentially of a low molecular weight diethylene glycol oxalate polyester. Three hundred and seventy-two grams (1.0 mole) of p,p'-sulfonyl dibenzoic acid diethyl ester and 124 grams (2.0 moles) of ethylene glycol were added to the reaction vessel. The mixture was stirred at 190–200° C. in a stream of purified nitrogen. The evolution of ethyl alcohol practically stopped after 2 hours. The temperature was raised to 265° and held for 30 minutes. A vacuum of 1.0 to 2.0 mm. was applied and stirring was continued for 3 hours. A product was obtained which has an inherent viscosity of 0.6 to 0.7 in 60% phenol-40% tetrachlorethane. This polyester can be extruded to make rods, tubes, films, etc. It can be molded by injection methods to give products having good impact strength. In the form of molded or extruded objects, the polyester softens at 140–150° C.

Example 7 (Oxalic ester)

One mole of propyl oxalate, two moles of p'p-sulfonyl dibenzoic acid dibutyl ester and three moles of diethylene glycol were condensed to give a polyester by the procedure described in Example 2. The product which was obtained has an inherent viscosity of 0.60–0.65 in 60% phenol-40% tetrachlorethane. This polyester is especially useful for the preparation of films and sheets by extrusion methods. It softens at 160–170° C.

Example 8 (Oxalic ester)

One mole of butyloxalate, three moles of p,p'-sulfonyl dibenzoic acid dibutyl ester, two moles of pentamethylene glycol, and two moles of diethylene glycol were condensed by the procedure described in Example 2. The product which was obtained has an inherent viscosity of 0.60–0.70 in 60% phenol-40% tetrachlorethane. The polyester can be molded by injection methods or extruded in the form of rods, tubes, films, etc. If softens at 170–180° C.

Example 9 (Carbonic ester)

1.0 gram mole (118 grams) of ethyl carbonate and 2.0 gram moles (292 grams) of decamethylene glycol were placed in a distilling flask equipped with a fractionating column together with 0.1 gram of sodium. The reaction mixture was heated in a stream of purified hydrogen for about 3½ hours at about 100°–115° C. until practically all of the ethyl alcohol was removed. The reaction mixture was then further heated at about 190° C. in the manner described in Example 1 above with the addition of 1.0 gram mole of p,p'-sulfonyl dibenzoic acid diethyl ester (372 grams) and an additional 2 gram moles of decamethylene glycol. After 4 hours the evolution of ethyl alcohol had practically ceased. The temperature was then raised to about 250°–260° C. for an additional hour under an atmospheric pressure of hydrogen, following which this temperature was maintained for 10 hours under a reduced pressure of about 0.5 mm. of Hg of hydrogen. The resulting interpolyester was of light color and useful as a molding resin. It softens at about 150° C. Similar results can be obtained using as the catalyst K, Ca, Li$_2$CO$_3$, CaBO$_3$, PbO (litharge), etc. Such catalysts can also be employed in the processes described in the other examples after making suitable allowances for the differences in the reaction rates inherent in the change of the catalyst.

What I claim is:

1. A process for preparing a linear polyester comprising (A) condensing about 10 mole proportions of a p,p'-sulfonyl dibenzoic diester having the formula:

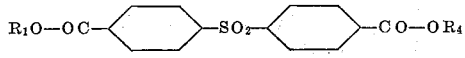

wherein R$_1$ and R$_4$ each represents a substituent selected from the group consisting of a β-hydroxy-alkyl radical containing from 2 to 4 carbon atoms, an omega-hydroxyalkyl radical containing from 3 to 12 carbon atoms and an alkyl radical containing from 1 to 6 carbon atoms, plus from about 1 to about 50 mole proportions of an aliphatic diester selected from the group consisting of those having the following formulas:

$$R_8R_9CO_3 \text{ and } R_8OOC\text{—}COOR_9$$

wherein R$_8$ and R$_9$ each represents a substituent selected from the group consisting of an omega-hydroxyalkyl radical containing from 2 to 12 carbon atoms and an alkyl radical containing from 1 to 6 carbon atoms, (B) with a dioxy compound selected from the group consisting of those compounds having the following formulas:

and
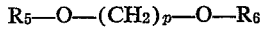
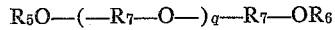

wherein p represents a positive integer of from 2 to 12, R$_5$ and R$_6$ each represents a substituent selected from the group consisting of a hydrogen atom and an acyl radical containing from 2 to 4 carbon atoms, R$_7$ represents an alkylene radical containing from 2 to 4 carbon atoms and q represents a positive integer of from 1 to 10 inclusive, the dioxy compound being employed in such a proportion that there is at least an equivalent amount of oxy substituents in proportion to the carbalkoxy substituents in the overall combination of the diesters and the dioxy compound, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals and lead oxide, (D) at an elevated temperature, (E) the condensation being conducted in an inert atmospheres, and (F) the latter part of the condensation being conducted at a very low pressure of the inert atmosphere, said process encompassing the condensation of only those compounds referred to in (A) and (B) hereinabove.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.27% based on the weight of the diesters employed.

4. A process as defined in claim 3 wherein the dioxy compound is employed in such a proportion that there are from about 1.2 to about 3 oxy substituents in proportion to the carbalkoxy substituents in the overall combination of the diesters and the dioxy compounds.

5. A process as defined in claim 4 wherein the elevated temperature employed during the earlier part of the condensation is from about 150° to about 220° C. and the low pressure defined under (F) is less than about 15 mm. of Hg pressure.

6. A process as defined in claim 5 wherein all materials employed in the process are substantially anhydrous.

7. A process as defined in claim 6 wherein the dioxy compound is a dihydroxy compound which has the formula:

$$HO\text{—}(CH_2)_p\text{—}OH$$

wherein p is defined under (B).

8. A process as defined in claim 7 wherein the aliphatic diester is ethyl carbonate and the dihydroxy compound is pentamethylene glycol.

9. A process as defined in claim 7 wherein the aliphatic diester is ethyl oxalate and the dihydroxy compound is pentamethylene glycol.

10. A process as defined in claim 7 wherein the aliphatic diester is ethyl carbonate and the dihydroxy compound is hexamethylene glycol.

11. A process as defined in claim 7 wherein the aliphatic diester is ethyl oxalate and the dihydroxy compound is hexamethylene glycol.

12. A process as defined in claim 6 wherein the aliphatic diester is ethyl oxalate and the dihydroxy compound is made up of equimolecular proportions of diethylene glycol and ethylene glycol.

13. A process as defined in claim 1 wherein the sulfonyl dibenzoic diester is formed by a preliminary step comprising condensing p,p'-sulfonyl dibenzoic acid with a dioxy compound which is defined under (B), at an elevated temperature, after which preliminary step the condensing agent which is defined under (C) is added and the condensation is completed as defined under (D), (E) and (F).

14. A process as defined in claim 13 wherein the preliminary elevated temperature is substantially that at which reflux conditions subsist, the subsequent condensation being conducted at a temperature which is gradually increased during the course of the condensation up to about 280°–310° C., and the dioxy compound is employed in such a proportion that there are from about 1.2 to about 3 oxy substituents in proportion to the carboxy and carbalkoxy substituents in the overall combination of the diacids, diesters and dioxy compounds.

15. A process as defined in claim 1 wherein the aliphatic diester is formed by a preliminary step comprising condensing an aliphatic acid selected from the group consisting of carbonic acid and oxalic acid with a dioxy compound which is defined under (B), at an elevated temperature, after which preliminary step the condensing agent which is defined under (C) is added and the condensation is completed as defined under (D), (E) and (F).

16. A process as defined in claim 15 wherein the preliminary elevated temperature is substantially that at which reflux conditions subsist, the subsequent condensation being conducted at a temperature which is gradually increased during the course of the condensation up to about 280°–310° C., and the dioxy compound is employed in such a proportion that there are from about 1.2 to about 3 oxy substituents in proportion to the carboxy and carbalkoxy substituents in the overall combination of the diacids, diesters and dioxy compounds.

17. A process as defined in claim 16 wherein the condensing agent is employed in an amount of from about 0.005% to about 0.2% based on the weight of the diesters being condensed, the elevated temperature employed during the earlier part of the condensation to form the interpolyester is from about 150° C. to about 220° C. and the low pressure defined under (F) is less than about 15 mm. of Hg pressure.

18. A linear interpolyester having a softening temperature differential of from about 5° to 20° C. wherein the molecular structure consists of a ratio of about 10 of the following repeating units:

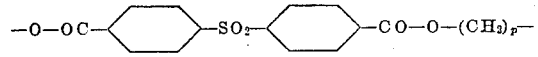

to each 1 to about 50 of one of a repeating unit selected from the group consisting of:

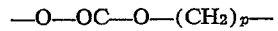

and

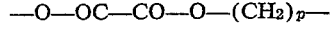

wherein $p$ represents a positive integer of from 2 to 12 and which interpolyester is capable of being readily formed into shaped objects within its softening range, and wherein the $—(CH_2)_p—$ units in the molecular structure include a substantial proportion of such units wherein $p$ is at least 4.

19. A linear interpolyester as defined in claim 18 wherein at least one of the repeating units depicted therein is replaced by a repeating unit corresponding thereto which is selected from the group consisting of the following repeating units:

and $$—O—OC—CO—O—(—R_7—O—)_q—R_7—$$

wherein $R_7$ represents an alkylene radical containing from 2 to 4 carbon atoms and $q$ represents a positive integer of from 1 to 10.

20. A linear interpolyester as defined in claim 18 wherein $p$ is 5 and the second repeating unit described in claim 18 is

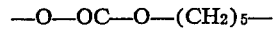

21. A linear interpolyester as defined in claim 18 wherein $p$ is 5 and the second repeating unit described in claim 18 is

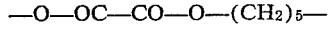

22. A linear interpolyester as defined in claim 18 wherein $p$ is 6 and the second repeating unit described in claim 18 is

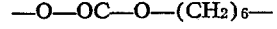

23. A linear interpolyester as defined in claim 18 wherein $p$ is 6 and the second repeating unit described is claim 18 is

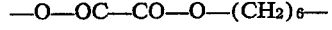

References Cited in the file of this patent

UNITED STATES PATENTS

| | | |
|---|---|---|
| 2,111,762 | Ellis | Mar. 22, 1938 |
| 2,465,319 | Winfield et al. | Mar. 22, 1949 |
| 2,547,113 | Drewitt et al. | Apr. 3, 1951 |
| 2,623,031 | Snyder | Dec. 23, 1952 |

FOREIGN PATENTS

| | | |
|---|---|---|
| 621,977 | Great Britain | Apr. 25, 1949 |